United States Patent
Ackley et al.

(10) Patent No.: US 8,879,465 B2
(45) Date of Patent: Nov. 4, 2014

(54) SYSTEM AND METHOD FOR MULTI-POWER SIGNALING DEVICE

(75) Inventors: Jonathan Michael Ackley, Glendale, CA (US); Scott F. Watson, Marina Del Rey, CA (US)

(73) Assignee: Disney Enterprises, Inc., Burbank, CA (US)

( * ) Notice: Subject to any disclaimer, the term of this patent is extended or adjusted under 35 U.S.C. 154(b) by 492 days.

(21) Appl. No.: 13/111,887

(22) Filed: May 19, 2011

(65) Prior Publication Data

US 2012/0294378 A1    Nov. 22, 2012

(51) Int. Cl.

| H04B 7/185 | (2006.01) |
|---|---|
| H04L 27/00 | (2006.01) |
| H04W 52/24 | (2009.01) |
| H04W 52/02 | (2009.01) |
| H04W 52/32 | (2009.01) |

(52) U.S. Cl.
CPC ............ *H04L 27/00* (2013.01); *H04W 52/245* (2013.01); *H04W 52/0209* (2013.01); *H04W 52/322* (2013.01)
USPC .......................................... 370/318; 455/13.4

(58) Field of Classification Search
CPC ..... H04W 52/24; H04W 52/16; H04W 52/50; H04W 52/0209; H04W 52/322
USPC .......................................................... 370/318
See application file for complete search history.

(56) References Cited

U.S. PATENT DOCUMENTS

| 6,560,463 B1 * | 5/2003 | Santhoff ........................ 455/522 |
| 7,310,535 B1 * | 12/2007 | MacKenzie et al. .......... 455/522 |
| 2008/0293447 A1 * | 11/2008 | Rofougaran ................ 455/553.1 |
| 2011/0019562 A1 * | 1/2011 | Cattuto et al. ................. 370/252 |
| 2012/0142392 A1 * | 6/2012 | Patel et al. .................... 455/522 |

\* cited by examiner

*Primary Examiner* — Shaq Taha
(74) *Attorney, Agent, or Firm* — Farjami & Farjami LLP

(57) ABSTRACT

There is provided a system and method for operating multi-power signaling device. There is provided a system comprising a memory, a transmitter, and a processor. The processor chooses a power level from a plurality of transmit power levels to be used as the strength for broadcasting the next signal to be broadcasted. The selected power level value is converted into a digital value and inserted into the data content of the signal to be broadcasted. The transmitter broadcasts the signal at the strength of the prior selected power level.

6 Claims, 3 Drawing Sheets

SYSTEM AND METHOD FOR MULTI-POWER SIGNALING DEVICE

BACKGROUND OF THE INVENTION

1. Field of the Invention

The present invention relates generally to signaling devices. More particularly, the present invention relates to multi-power signaling devices.

2. Background Art

Radio frequency signaling devices, such as radio frequency identification (RFID) devices, have often been used to track human beings in public places in order to gather information related to their behavior and habits. Such information may be valuable for business or other reasons. Since radio frequency devices are relatively small and lightweight, such devices may be easily attached onto human clothing. For example, when a guest with an attached RFID device traverses through an amusement park, the signal emitted from the RFID tag may be strong enough to be detected by all receivers in the amusement park. A receiver is a device that may detect the radio frequency (RF) signals emitted from the RFID device through the RFID tag. Receivers may be installed on interactive attractions or in other locations. Therefore, determining the existence of a person within an amusement park may be simple and relatively inexpensive. Furthermore, if the RF signal may be configured to be strong enough to reach only a subset of all receivers within the amusement park at any location, then such a RF signal strength configuration may generate information that may better pinpoint the location of the guest in amusement park. The RFID device may also transmit RF signals small enough to trigger only an interactive attraction the guest engages with at close range. Thus, an amusement park may compile such data gathered from transmissions from RFID devices in order to determine the popularity of each attraction to the individual.

Since current RFID devices may transmit RF signals at only one constant power level, it may be difficult to create a personalized location-based experience using current RFID devices. A personalized location-based experience may be based upon the concept that the environment may react to the guest's movement and location in order to improve the guest's visit. For example, as a guest may be traveling across the open grounds of an amusement park, the guest may wear a RFID device on his or her clothing. The RFID device transmits a RF signal containing information corresponding to that guest and such information may activate certain interactive attractions within the guest's surroundings to create a personalized location-based experience for the guest. Since the RFID device may transmit RF signals at a fixed power level, the range of the signal may be fixed as well, and difficulties with using a single power level RFID device to create a personalized location-based experience may become evident. If all RF signals broadcasted at the highest power level travel for a maximum of 300 meters, then all interactive attractions within 300 meters of the RFID device may be activated by the RF signals and attempt to attract the guest's attention. Thus, RF signals transmitted at highest power level may cause too many attractions outside the proximity of the guest to be operating and results in needless wastes of power usages. Broadcasting RF signals using the lowest power level for a range of up to, say, 10 meters may activate too few attractions to operate for the guest's interactive experience or to attract the guest's attention. Transmitting a signal at only one power level between the highest power level and lowest power level may still fail to guarantee that only the necessary and relevant interactive attractions are operating for the guest's personalized location-based experience. Therefore, current RFID devices that emit RF signals at a single power level may be too inflexible to create, easily and inexpensively, a location-specific personalized experience for a guest.

An activation field generated by each interactive attraction may be used to detect for the RFID device within proximity to the interactive attraction. However, each different activation field may direct the RFID device to transmit a signal at a unique power level so that the source listener of the activation field may accurately detect the signal transmitted from the RFID device. Currently, a RFID device only emits signals at one power level. Therefore, current RFID devices are incapable of being easily integrated into a system with numerous activation fields for the purposes of creating a location-specific personalized experience for the RFID device user.

Accordingly, there is a need to overcome the drawbacks and deficiencies in the art by providing an intuitive and easy to use radio frequency signaling device within a modern technological setting.

SUMMARY OF THE INVENTION

There are provided method and system for the multi-power signaling device, substantially as shown in and/or described in connection with at least one of the figures as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a method and system for the multi-power signaling device. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
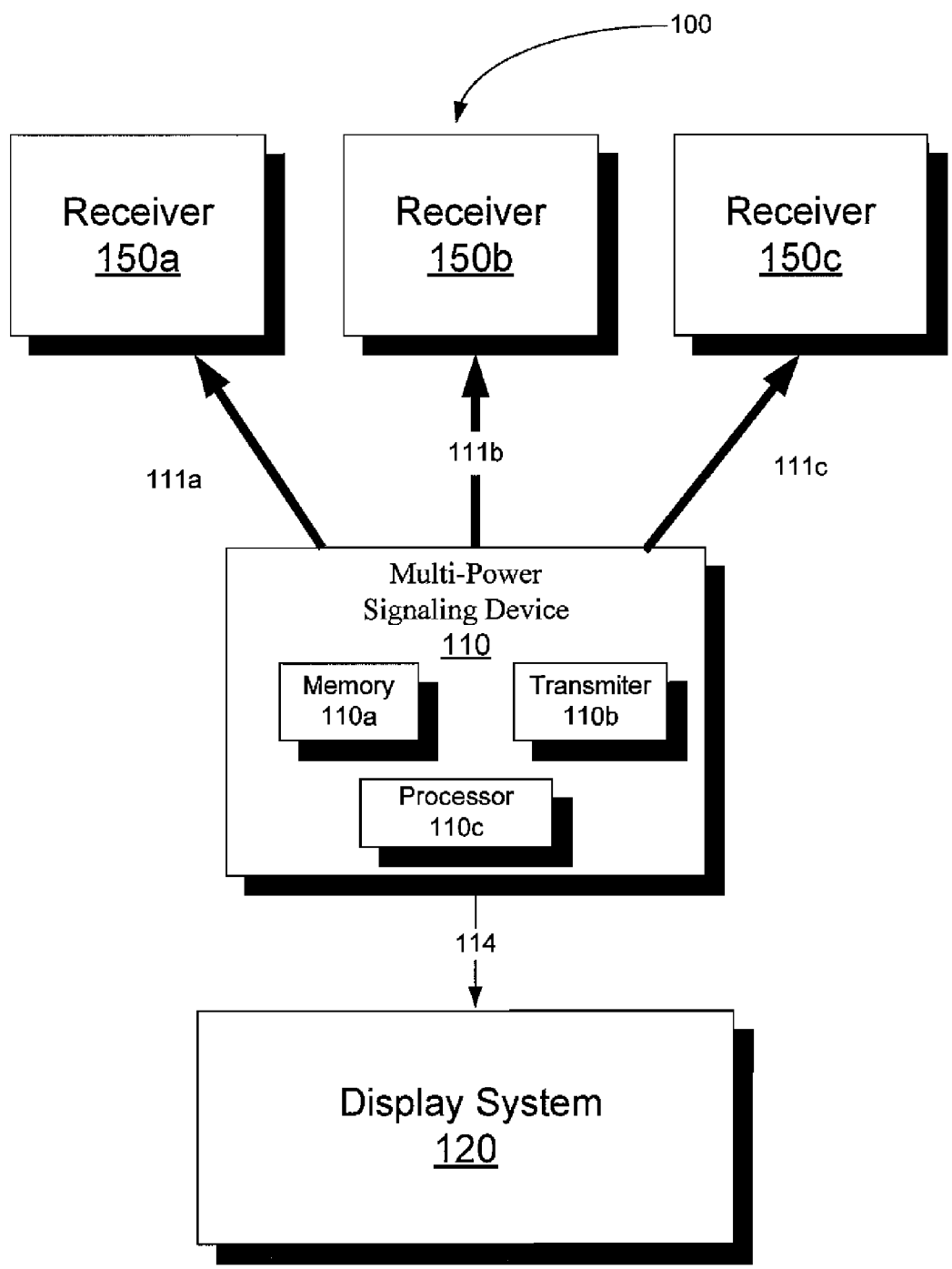
FIG. 1 presents a diagram of a signal device functioning within a simple environment.

FIG. 1 presents a diagram of a signaling device functioning within a simple environment. Diagram 100 of FIG. 1 includes multi-power signaling device 110, display system 120, receiver 150a, 150b and 150c, high power signal 111a, 111b and 111c, and low power signal 114. Multi-power signaling device 110 includes memory 110a, transmitter 110b, and processor 110c. Receiver 150a, 150b and 150c are three separate but identical receivers. Henceforth, receiver 150a, 150b, and 150c shall be collectively designated as receiver 150, unless otherwise noted. Furthermore, high power signal 111a, 111b and 111c are three separate but identical high power signals. Henceforth, high power signal 111a, 111b and 111c shall be collectively designated as high power signal 111, unless otherwise noted.

In one embodiment of the invention as shown in FIG. 1, multi-power signaling device 110 may be a physical device capable of emitting radio frequencies (RF) signals. In other embodiments of the invention, multi-power signaling device 110 may be capable of transmitting Bluetooth signals, optical signals, or other types of signals. Optical signals may be transmitted through transmitter 110b, which may be configured as light emitting diodes (LEDs) or laser diodes transmitting infrared frequencies. The power levels of optical signals transmitted from transmitter 110b configured as LEDs or laser diodes, may be regulated with pulse width modulation (PWM) technique or other techniques. Each signal may be emitted from transmitter 110b at a power level selected from among a plurality of transmit power levels. The power level of the emitted signal may be chosen by processor 110c. Each power level may correspond to a different transmission strength level. A high power level may be associated with a relatively long-range signal, and a low power level may be associated with a relatively short-range signal. In one embodiment of the invention as shown in FIG. 1, multi-power signaling device 110 may be capable of transmitting high power signal 111 with a power level of 15 or transmitting low power signal 114 with a power level of one. A power level of 15 may, for example, correspond to a maximum signal range of 300 meters, and a power level of one, for example, may correspond to a maximum signal range of 10 meters. In one embodiment of this invention as shown in FIG. 1, each emitted high power signal 111 and each emitted low power signal 114 may contain data revealing the power level at which the signals may have been emitted along with other payload information. This data may be digital data that may be inserted into the payload of an emitted signal. The payload portion of an emitted signals contains may contain any type of digital data. In yet other embodiments of the invention, multi-power signaling device 110 may be configured to detect for activation fields, which may induce multi-power signaling device 110 to transmit signals at a particular power level and with particular data incorporated into that emitted signal in the structure of a payload.

In one embodiment of the invention as shown in FIG. 1, receiver 150 may be a listener device that detects for signals emitted from multi-power signaling device 110 at a power level of 15. As stated earlier, a signal transmitted at power level 15 may have a maximum range of 300 meters. If receiver 150 may be located within 300 meters from multi-power signaling device 110 as multi-power signaling device 110 emits high power signal 111, then receiver 150 may be able to detect for emitted high power signal 111. Multi-power signaling device 110 may also be capable of emitting low power signal 114 at a power level of one. As indicated earlier, low power signal 114 emitted at a power level of one may have a maximum transmission range of 10 meters from multi-power signaling device 110. Similar to receiver 150, display system 120 may be configured to detect for radio frequency signals emitted at a particular power level from multi-power signaling device 110. Display system 120 may be configured to detect for low power signal 114 at power level one. If display system 120 may be only 10 meters away from multi-power signaling device 110 when multi-power signaling device 110 emits low power signal 114, then display system 120 may detect low power signal 114 emitted from multi-power signaling device 110. Receiver 150 may be configured to ignore low power signal 114 because low power signal 114 does not have a power signal of 15. Likewise, display system 120 may be configured to ignore high power signal 111 because high power signal 111 does not have a power level of one. In one embodiment of the invention as shown in FIG. 1, when display system 120 detects low power signal 114, display system 120 may display commercials or other visuals displays, which may be for advertisement purposes or for other entertainment purposes.

In one embodiment of the invention as shown in FIG. 1, multi-power signaling device 110 includes memory 110a, processor 110c, and transmitter 110b. The processor 110c may be configured to direct the transmitter 110b to emit signals at a power level selected from a plurality of power levels. Processor 110c may also insert a digital data corresponding to power level of a signal into that signal's payload, which may be transmitted with the signal during signal emission. Memory 110a may be accessed by processor 110c to identify if there may be other signals at particular power levels needing to be transmitted.

Figure 2:
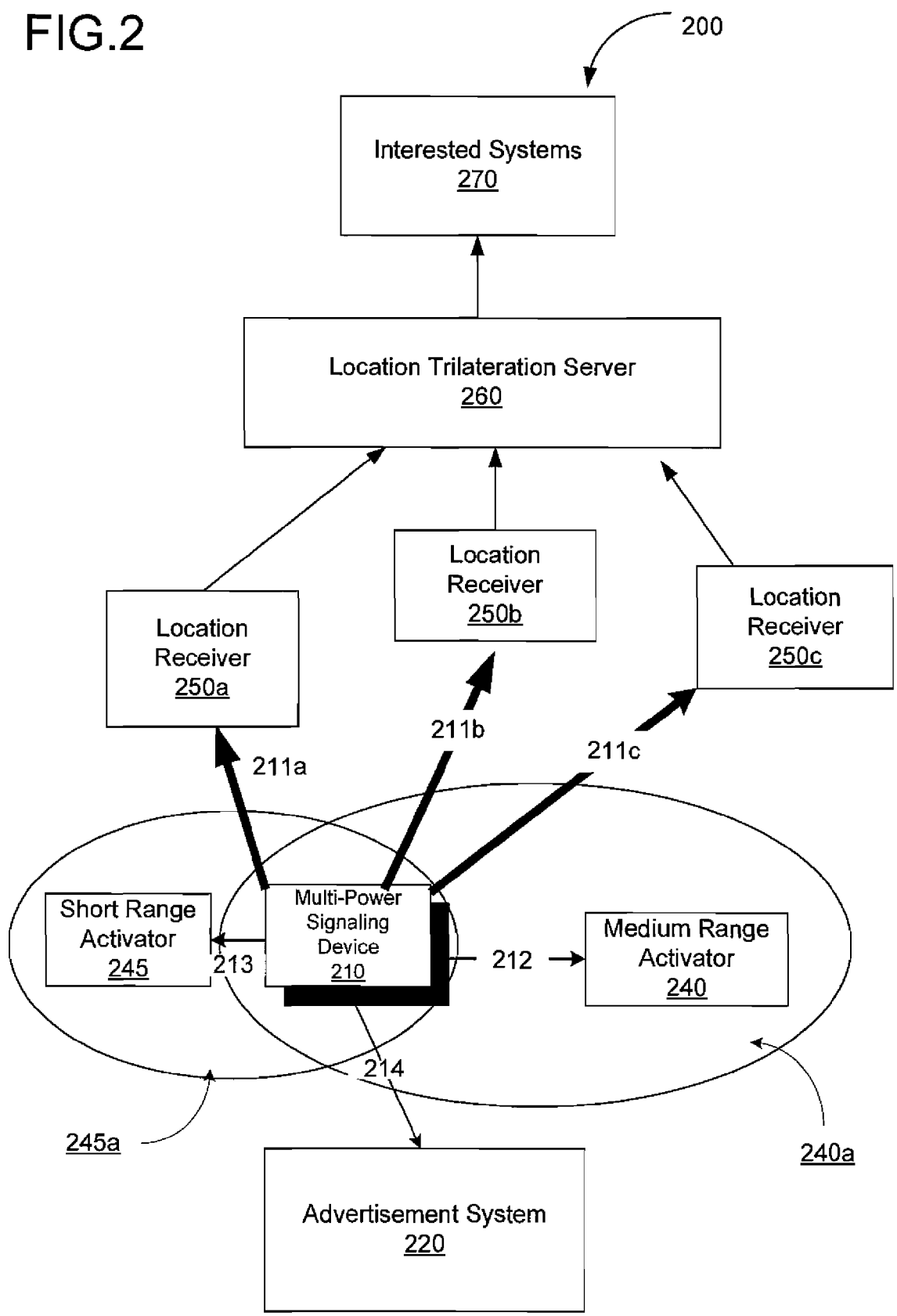
FIG. 2 presents a diagram of a multi-power signaling device functioning within a complex environment.

Moving to FIG. 2, FIG. 2 presents a diagram of a multi-power signaling device functioning within a complex environment. Diagram 200 of FIG. 2 includes multi-power signaling device 210, advertisement system 220, high power signal 211a, 211b and 211c, medium power signal 212, short power signal 213, low power signal 214, medium range activator 240, medium range activation field 240a, short range activator 245, short range activation field 245a, location receiver 250a, 250b and 250c, location trilateration server 260, and interested systems 270. With regards to FIG. 2, multi-power signaling device 210 may correspond to one embodiment of multi-power signaling device 110 in FIG. 1, high power signal 211a, 211b and 211c may each corresponds to high power signal 111a, 111b and 111c of FIG. 1, respectively, low power signal 214 may corresponds to low power signal 114, and location receiver 250a, 250b and 250c may each correspond to location receiver 150a, 150b and 150c of FIG. 1, respectively. High power signal 211a, 211b and 211c are three separate but identical high power signals. Henceforth, high power signal 211a, 211b and 211c may be collectively referred to as high power signal 211. Receiver location 250a, 250b and 250c are three separate but identical receivers. Henceforth, receiver 250a, 250b and 250c may be collectively referred to as receiver 250.

In one embodiment of the invention as shown in FIG. 2, multi-power signaling device 210 may be capable of emitting a signal through multi-power signaling tag at a power level selected from a plurality of transmit power levels. The multi-power signaling tag may be part of multi-power signaling device 210. In other embodiments of the invention, multi-power signaling device 210 may be an active RFID device, or a Bluetooth transmitter. In yet other embodiments of the invention, multi-power signaling device 210 may be any type of RFID device with capability to transmit any type of signals, including radio frequency signals and Bluetooth signals.

In one embodiment of the invention as shown in FIG. 2, multi-power signaling device 210 may transmit signals at various power levels to various types of listeners. The higher the signal power level, the longer the signal's range. Likewise, the lower the signal's power level the shorter the signal's range. For example, multi-power signaling device 210 may emit high power signal 211, which may have a power level of 15. A power level of 15 may correspond to a maximum signal range of 300 meters. Multi-power signaling device 210 may also transmit low power signal 214, which may have a power level of one. A power level of one may correspond to a maximum signal range of 10 meters. Multi-power signaling device 210 may transmit a medium signal 212, which may have a power level of eight. A power level of eight may correspond to a maximum signal range of 150 meters. Lastly, multi-power signaling device 210 may transmit a short power signal 213 at a power level of three. A power level of three may correspond to a maximum signal range of 60 meters. The signals emitted by multi-power signaling device 210 may be radio frequency (RF) signals.

Multi-power signaling device 210 may emit signals at different power levels in response to internal control. In one embodiment of the invention as shown in FIG. 2, multi-power signaling device 210 may emit signals at various power level in response to receiving a time interval trigger generated from internal time interval coordinator. Internal time interval coordinator may generate time interval triggers selected from a plurality of time interval triggers. Each time interval trigger may correspond to a transmit power level for multi-power signaling device 210 to select.

In one embodiment of the invention as shown in FIG. 1, internal time interval coordinator within multi-power signaling device 210 may generate a time interval trigger causing multi-power signaling device 210 to transmit high power signal 211 at power level 15 once every seven minutes. Internal time interval coordinator may also generate time interval trigger causing multi-power signaling device 210 to transmit low power signal 214 at power level one once every 20 seconds. Multi-power signaling device 210 may allocate a longer time interval between the transmission of signals at high or higher power levels, and multi-power signaling device 210 may allocate a shorter time interval between the transmission of signals at low or lower power levels. In other embodiments of the invention, time interval between the broadcasting of signals at same power level may be set within multi-power signaling device 210 to be any time interval.

In one embodiment of the invention as shown in FIG. 2, multi-power signaling device 210 may be induced to transmit signals at a particular power level by an external source. Multi-power signaling device 210 may be configured to sense for activation fields that may induce multi-power signaling device 210 to transmit signals at various power level. Multi-power signaling device 210 may be configured to sense for activation fields prior to determining power level of signal to transmit. For example, medium range activator 240 may create a medium range activation field 240a. Medium range activation field 240a may be emitted from medium range activator 240 for a distance of up to 150 meters. In other embodiments of the invention, medium range activation field 240a may be configured to emit up to any range from medium range activator 240. When multi-power signaling device 210 may be within range of medium range activation field 240a, multi-power signaling device 210 may sense medium range activation field 240a and multi-power signaling device 210, in response, may be induced to transmit medium power signal 212, which may be transmitted at a power level of eight. A power level of eight may correspond to a signal transmission with maximum distance of 150 meters. Medium range activation field 240a may also require medium power signal 212 to insert a digital value, corresponding to medium power signal 212 power level of eight, into medium power signal 212 payload. In one embodiment of the invention, as shown in FIG. 2, digital value inserted into medium power signal 212 may be a byte value corresponding to eight. In another example, multi-power signaling device 210 may be physically located within short-range activation field 245a, which may be emitted from short-range activator 245 for up to a range of 60 meters. The short-range activation field 245a induces multi-power signaling device 210 to transmit short-range power signal 213 at power level of three, which may correspond to transmission range of 60 meters. A byte value of three may then be stored within the payload of short power signal 213 during transmission of short power signal 213 from multi-power signaling device 210 to short range activator 245.

In one embodiment of the invention as shown in FIG. 2, the duration of the transmission of a signal at a particular power level from multi-power signaling device 210 may be associated with a corresponding time interval. This corresponding time interval may be different for different power levels available within multi-power signaling tag 210. For example, multi-power signaling device 210 may be configured to transmit signals at power level one for one second, at power level three for three seconds, at power level eight for four seconds and at power level 15 for five seconds. Within multi-power signaling device 210, corresponding time interval associated with signal transmission time at a particular power level may be set to be any time interval.

Multi-power signaling device 210 may transmit signals through a built-in multi-power signaling tag. The multi-power signaling tag may only transmit signals at one particular power level during any time period. Therefore, situations may easily occur where two or more signals with different power levels may need to be transmitted during the exact same time period. For example, multi-power signaling device 210 may be required by the internal time interval coordinator to transmit signals at high power signal 211 during the same time interval multi-power signaling device 210 maybe physically located within medium range activation field 240a. Medium range activation field 240a may also require multi-power signaling device 210 to transmit medium power signal 212 to medium range activator 240, but multi-power signaling device 210 may not be able to transmit medium power signal 212 instantly because multi-power signaling device 210 may be currently transmitting high power signal 211. One solution to this transmission conflict may be to require multi-power signaling device 210 to store into an internal memory queue all power levels that may have been requested of multi-power signaling device 210 to transmit but which may not have been transmitted yet. Once multi-power signaling device 210 maybe finished with transmitting high power signal 211, multi-power signaling device 210 may be automatically directed by internal memory queue to begin transmitting medium power signal 212, due to multi-power signaling device 210 having been exposed to medium range activation field 240a earlier when multi-power signaling device 210 may had been transmitting high power signal 211. The internal memory queue may be implemented as a first in first out queue data structure. In an alternative solution, multi-power signaling device 210 may simply prevent internal time interval coordinator from generating a time interval trigger, or multi-power signaling device 210 may prevent multi-power signaling device 210 from sensing activation fields emitted from activators. In other embodiments of this invention, multi-power signaling device 210 may be configured in other manners to handle conflict of power level in transmissions.

Short range activator 245 and medium-range activator 240 may both serve as listeners or transmitters. Both short range activator 245 and medium range activator 240 may have the capabilities to induce multi-power signaling device 210 to transmit signals at a particular power level and to accept and to receive signals at the particular power level transmitted from multi-power signaling device 210.

In one embodiment of the invention as shown in FIG. 2, short range activator 245 may transmit short range activation field 245a with a detection range to induce multi-power signaling device 210 within range of short range activation field 245a to transmit short power signal 213 to short range activator 245. Detection range may be a part of the short range activation field 245a and detection range may contain information which may direct multi-power signaling device 210 to emit to short range activator 245 signals with a particular power level. Detection range may direct multi-power signaling device 210 to select a particular power level for the transmission of signals. Likewise, medium range activator 240 may emit medium range activation field 240a with detection range to induce multi-power signaling device 210 within range of medium range activation field 240a to transmit medium power signal 212 to medium range activator 240. In other embodiments of the invention, short range activator 245 and medium range activator 240 may even dictate the contents to be incorporated within the transmitted signal from multi-power signaling device 210 to short range activator 245 or to medium range activator 240. Short range activator 245 may be configured to accept only signals broadcasted at short power signal 213, which may have a power level of three. Likewise, medium range activator 240 may be configured to accept only signals broadcasted at medium power signal 212, which may have a power level of eight.

In one embodiment of the invention as shown in FIG. 2, detection range incorporated within medium range activation field 240a or short range activation field 245a may be configured to embed transmit data stored within detection range that may be incorporated into the payload of the transmit signals. For example, medium range activator 240 may configure detection range within medium range activation field 240a to induce a particular multi-power signaling device 210 to transmit a medium power signal 212 along with the transmit data stored within detection range, and such transmit data may be added into the payload of the medium power signal 212. Transmit data may be any type of data transmitted from activator, including the very query or inducement data which may cause multi-power signaling device 210 to transmit data.

The ability of multi-power signaling device 210 to transmit at different frequencies or optical signals and with payload data dictated by detection range facilitates allows any activator to contact specifically with unique multi-power signaling device 210 within an area around the activator. In one embodiment of the invention as shown in FIG. 2, for example, medium range activator 240 may transmit a detection range that not only induces any multi-power signaling device 210 within medium range activation field 240a to transmit back at medium power signal 212 with power level of eight, but also to transmit back any other data requested by detection range, such as any data unique to multi-power signaling device 210. Thus, medium range activator 240 may be able to identify uniquely multi-power signaling device 210 within medium range activation field 240a, which corresponds to a range of 150 meters, upon receiving unique data transmitted from multi-power signaling device 210. Once medium range activator 240 may be able to identify the unique multi-power signaling device 210, medium range activator 240 may be able to communicate uniquely with that unique multi-power signaling device 210 with the capabilities equipped within medium range activator 240.

Furthermore, by transmitting the transmit data within detection range back to any activators, an activator may be able to distinguish more easily which activator multi-power signaling device 210 may be responding to. For example, medium range activator 240 may insert a transmit data unique for identifying medium range activation activator 240 into detection range of medium range field activation 240a. Thus, when multi-power signaling device 210 inserts the transmit data into the payload of the transmit signal and transmits the transmit signal back to medium range activator 240, medium range activator 240 may recognize that such transmit signal from multi-power signaling device 210 may have been specifically induced by medium range activator 240.

In one embodiment of the invention as shown in FIG. 2, short range activation field 245a and medium range activation field 240a may be able to upload new software logic into multi-power signaling device 210 and such new software logic may change the behavior of multi-power signaling device 210. Multi-power signaling device 210 may be configured to be receptive to new software logic downloaded from short range activation field 245a and medium range activation field 240a. Multi-power signaling device 210 may also be configured to be unreceptive to loading new logic from short range activation field 245 and medium range activation field 240a. New logic may alter, for example, the power level spectrum and power level distance within multi-power signaling device 210, unique identification data, type of responses to short range activator 245 and medium range activator 240, and payload information to add to present or future transmit signals.

Advertisement system 220 may be configured to detect low power signal 214 transmitted from multi-power signaling device 210. In one embodiment of the invention as shown in FIG. 2, advertisement system 220 may be configured to display commercials once advertisement system 220 detects a signal from multi-power signaling device 210 at a low power signal 214. For example, advertisement system 220 may be configured to detect only for low power signal 214 with power level one. Detecting low power signal 214 with power level one may indicate to advertisement system 220 that the user of multi-power signaling device 210 maybe in very close proximity to advertisement system 220 because low power signal 214 with power level one may only have a maximum range of 10 meters. Thus, once advertisement system 220 detects a low power signal 214 with power level one, advertisement system 220 may begin displaying commercials with the intent that nearby user of multi-power signaling device 210 maybe close enough to notice the commercials.

Advertisement system 220 may be configured to detect for signals transmitted from multi-power signaling device 210 constantly. Advertisement system 220 may be configured to stop displaying commercials when advertisement system 220 no longer detects any signals emitted from multi-power signaling device 210 at power level one for a set time interval. The disappearance of low power signal 214 at power level one may indicate to advertisement system 220 that the user of multi-power signaling device 210 may no longer be physically near advertisement system 220. Advertisement system 220 may be any type of system capable of displaying visual advertisements for users to view. Advertisement system 220 may be located in any geographical location.

In one embodiment of the invention as shown in FIG. 2, location receiver 250 may be located in any geographical location. Location receiver 250 may be configured to respond only for signals transmitted from multi-power signaling device 210 at a power level of 15. Location receiver 250 may generate data that may be analyzed by other systems to determine where multi-power signaling device 210 maybe located within a general area. For example, multi-power signaling device 210 transmits high power signal 211 at power level 15, which corresponds to a maximum signal range of 100 meters. With a transmission range of 100 meters, high power signal 211 may be able to reach location receiver 250 located within 100 meters of multi-power signaling device 210. High power signal 211 may also include a byte value of 15 corresponding to power level 15. Location receiver 250 may recognize the byte value 15 in high power signal 211 and accept high power signal 211 based on that recognition. The information gathered by location receiver 250 from receiving high power signal 211 may be further transmitted to location trilateration server 260.

Location trilateration server 260 may use the information transmitted from location receiver 250 to perform trilateration operations in order that location trilateration server 260 may use data from receiver 150 to determine the general location of multi-power signaling device 210. Location receiver 250 may generally ignore signals sent at lower power signals that may not be at power level 15. Once location trilateration server 260 has processed the information received from location receiver 250, location trilateration server 260 may pass this information off to interested systems 270.

Interested systems 270 might be any information system such as network databases or servers that may have a need or desire for the information created by location trilateration server 260.

Figure 3:
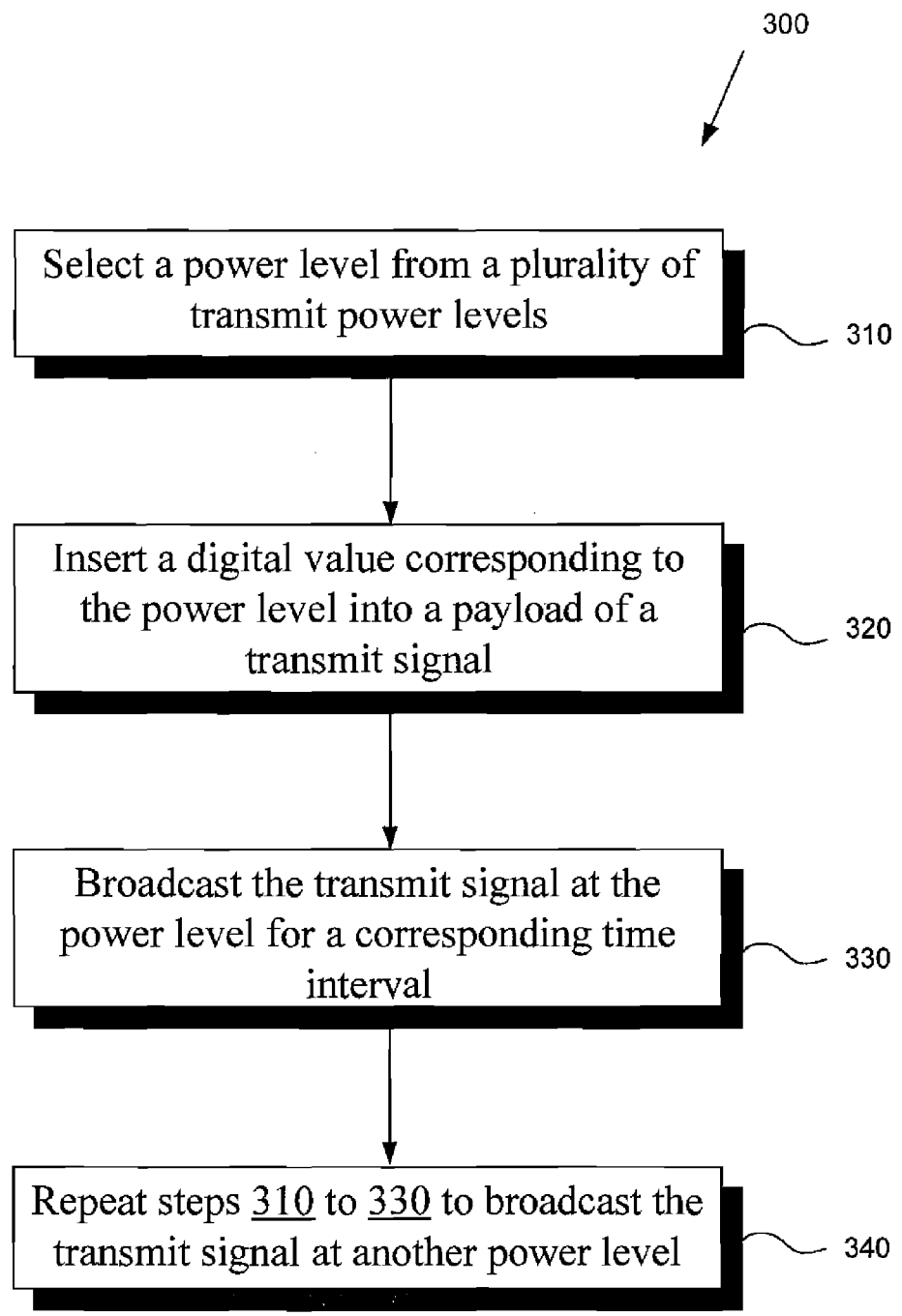
FIG. 3 shows a flowchart describing the steps, according to one embodiment of the present invention, by which the multi-power signaling device may be provided.

Moving on to FIG. 3, FIG. 3 shows a flowchart describing the steps, according to one embodiment of the present invention, by which the multi-power radio frequency identification device may be provided. Certain details and features have been left out of flowchart 300 that are apparent to a person of ordinary skill in the art. For example, a step may comprise one or more sub-steps or may involve specialized equipment or materials, as known in the art. While steps 310 through 340 indicated in flowchart 300 are sufficient to describe one embodiment of the present invention, other embodiments of the invention may utilize steps different from those shown in flowchart 300.

Referring to step 310 of flowchart 300 in FIG. 3 and diagram 100 of FIG. 1, step 310 of flowchart 300 comprises multi-power signaling device 110. Multi-power signaling device 110 may be configured to be able to select a power level at which multi-power signaling device 110 may generate a signal. Multi-power signaling device 110 may be configured to select a power level from a plurality of transmit power levels based on a time interval trigger from an internal time interval coordinator. The internal time interval coordinator comprises a plurality of time interval triggers and each time interval trigger corresponds to a particular power level. When the internal time interval coordinator generates a time interval trigger, multi-power signaling device 110 may detect the time interval trigger and determine a corresponding power level for transmission of next signal based upon detected time interval trigger. There may also be an alternative manner in which multi-power signaling device 110 may select a power level signal transmission. Referring to diagram 200 of FIG. 2, multi-power signaling device 210 may select a power level based on the activation field which multi-power signaling device 210 might be exposed to. For example, multi-power signaling device 210 in diagram 200 of FIG. 2 may be exposed to medium range activation field 240a. Medium range activation field 240a may indicate to multi-power signaling device 210 to select a medium range power level.

Referring to step 320 of flowchart 300 in FIG. 3 and diagram 100 of FIG. 1, step 320 of flowchart 300 comprises multi-power signaling device 110 creating a digital value corresponding to selected power level from step 310 and inserting that digital value as a byte value into a payload of signal for transmission at selected power level. Thus, referring to diagram 100 of FIG. 1, multi-power signaling device 110 generates a byte value corresponding to the selected power level for the next signal transmission, and inserts byte value into the signal payload prior to signal transmission.

Referring to step 330 of flowchart 300 in FIG. 3 and diagram 100 of FIG. 1, step 330 of flowchart 300 comprises multi-power signaling device 110 broadcasting the signal at a power level based on the signal provided after step 320. Thus, referring to diagram 100 of FIG. 1, multi-power signaling device 110 transmits any signal with particular power level. Multi-power signaling device 110 may broadcast high power signal 111 with power level 15, low power signal 114 with power level one, medium power signal with power level eight, or short power signal with power level three. Each power level transmission may correspond to a particular time interval between transmission start and transmission finish.

As indicated by step 340 of flowchart 300, steps 310 through 330 may be repeated for additional power levels for signals being broadcasted. Referring to FIG. 1, for example, where a first iteration of steps 310 through 330 associated a signal transmitted with a particular power level, a second iteration of steps 310 through 330 may be performed to associate a signal transmitted with at a different power level, and so forth.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangement, modifications, and substitutions without departing from the scope of the invention.

What is claimed is:

1. A method for operating a multi-power signaling device, the method comprising:

generating a first time interval trigger of a plurality of time interval triggers using an internal time interval coordinator, wherein each of the plurality of time interval triggers corresponds respectively to each of a plurality of transmit power levels;

selecting a first power level from the plurality of transmit power levels corresponding to the first time interval trigger;

inserting a first digital value corresponding to the first power level into a payload of a first transmit signal;

broadcasting the first transmit signal at the first power level in response to the first time interval trigger;

generating a second time interval trigger of the plurality of time interval triggers using the internal time interval coordinator;

selecting a second power level from the plurality of transmit power levels corresponding to the second time interval trigger, wherein the second power level is lower than the first power level;

inserting a second digital value corresponding to the second power level into a payload of a second transmit signal; and broadcasting the second transmit signal at the second power level in response to the second time interval trigger, wherein the second transmit signal is broadcast at a shorter range than the first transmit signal.

2. The method of claim 1, wherein the multi-power signaling device comprises an active radio-frequency identification (RFID) device.

3. The method of claim 1, wherein the multi-power signaling device comprises a Bluetooth transmitter.

4. A multi-power signaling device comprising:
a transmitter; and
a processor configured to:
generate a first time interval trigger of a plurality of time interval triggers using an internal time interval coordinator, wherein each of the plurality of time interval triggers corresponds respectively to each of a plurality of transmit power levels;
select a first power level from the plurality of transmit power levels corresponding to the first time interval trigger;
insert a first digital value corresponding to the first power level into a payload of a first transmit signal;
broadcast, using the transmitter, the first transmit signal at the first power level in response to the first time interval trigger;
generate a second time interval trigger of the plurality of time interval triggers using the internal time interval coordinator;
select a second power level from the plurality of transmit power levels corresponding to the second time interval trigger, wherein the second power level is lower than the first power level;
insert a second digital value corresponding to the second power level into a payload of a second transmit signal; and
broadcast, using the transmitter, the second transmit signal at the second power level in response to the second time interval trigger, wherein the second transmit signal is broadcast at a shorter range than the first transmit signal.

5. The system of claim 4, wherein the multi-power signaling device comprises an active radio-frequency identification (RFID) device.

6. The system of claim 4, wherein the transmitter comprises a Bluetooth transmitter.

\* \* \* \* \*